United States Patent
Koizumi et al.

[11] Patent Number: 6,101,389
[45] Date of Patent: Aug. 8, 2000

[54] METHOD OF ASSIGNING IDLE CHANNELS

[75] Inventors: Manabu Koizumi; Shigeru Kimura, both of Yokohama, Japan

[73] Assignee: Kyocera Corporation, Kyoto, Japan

[21] Appl. No.: 08/991,843

[22] Filed: Dec. 16, 1997

[30] Foreign Application Priority Data

Dec. 19, 1996 [JP] Japan .................................... 8-355245

[51] Int. Cl.[7] .................................................. H04B 7/20
[52] U.S. Cl. .......................................... 455/450; 455/462
[58] Field of Search ................................... 455/450, 455, 455/464, 62, 434, 516, 452

[56] References Cited

U.S. PATENT DOCUMENTS

| | | | |
|---|---|---|---|
| 5,203,008 | 4/1993 | Yasuda et al. .......................... | 455/33.1 |
| 5,420,863 | 5/1995 | Taketsugu ................................ | 370/95.3 |
| 5,475,864 | 12/1995 | Hamabe ................................... | 455/33.1 |
| 5,566,227 | 10/1996 | DeVaney .................................. | 379/59 |
| 5,606,727 | 2/1997 | Ueda ...................................... | 455/34.1 |
| 5,625,672 | 4/1997 | Yamada ................................... | 379/59 |
| 5,793,842 | 8/1998 | Schloemer et al. ....................... | 379/58 |

*Primary Examiner*—Reinhard J. Eisenzopf
*Assistant Examiner*—N. Mehrpour
*Attorney, Agent, or Firm*—Hogan & Hartson LLP

[57] ABSTRACT

In a method of assigning an idle channel in which a base station assigns an idle channel in response to a link channel establishment request from a mobile terminal, a criterion level for judging whether an idle channel is to be used or not is set to an appropriate level which is higher than a limit level of a ratio of an interference level to a detectable signal receiving level (a DU ratio). In response to a link channel establishment request from a mobile terminal, the base station performs carrier sensing operation to obtain all idle channels and signal receiving levels of the idle channels, selects an idle channel having a level which exceeds the set criterion level and is closest to the criterion level, and assigns the selected idle channel as a link channel.

6 Claims, 4 Drawing Sheets

METHOD OF ASSIGNING IDLE CHANNELS

BACKGROUND OF THE INVENTION

The invention relates to a method of assigning an idle channel in which an idle channel is assigned in response to a link channel establishment request transmitted from a mobile terminal such as a portable telephone or a PHS (personal handyphone system) to a base station, and particularly to a method of assigning an idle channel to efficiently use frequencies.

FIG. 3 is a diagram showing an example of the configuration of a base station. As shown in the figure, the base station comprises an antenna 11, a selector switch 12, an amplifier 13, a mixer 14, an IF section (an intermediate frequency section) 15, a modem section 16, an interface 17, a synthesizer 18, a mixer 19, and an amplifier 20.

The base station receives a signal transmitted from a mobile terminal in its own service area, via the antenna 11. The received signal is supplied to the amplifier 13 through the selector switch 12. The amplifier 13 amplifies the signal. The signal is then subjected to frequency conversion by an output of the synthesizer 18 in the mixer 14, and subjected to filter and amplification processings in the IF section 15. Thereafter, the signal is demodulated in the modem section 16 and then output to a line (a usual telephone line) via the interface 17.

A signal from the line is modulated in the modem section 16 and then subjected to filter and amplification processings in the IF section 15. Then, the signal is converted into a high-frequency signal in the mixer 19, amplified in the amplifier (power amplifier) 20, and transmitted to the mobile terminal from the antenna 11 through the selector switch 12.

The synthesizer 18 is an oscillator which generates a signal of a channel frequency (carrier). The output frequency of the synthesizer 18 is set by a channel set signal from the modem section 16, and control and message channels are established. When a mobile terminal is moved into a service area of a base station, the mobile terminal transmits a link channel establishment request to the base station. The base station assigns an appropriate channel selected from idle channels and exchanges information with the mobile terminal.

FIG. 4 is a diagram showing an example of service areas of base stations and channel assignment. In the illustrated example, base stations a, b, c, and d which are connected to a network communicate with mobile terminals in their service areas. First, a mobile terminal a transmits a link channel establishment request to the base station a. The base station a which receives the link channel establishment request informs the mobile terminal a of an information channel (a control channel) which is previously (or after the request) judged as an idle channel as a result of the carrier sensing operation (carrier search), so as to establish the link channel.

In the assignment of an idle channel, a channel having a receiving level equal to or higher than a detectable level, and having the lowest interference level (disturbance level) is selected so as to obtain good speech quality. In other words, a channel (carrier) having the highest DU ratio (Desired signal (signal receiving level) to Undesired signal (interference level) ratio) is selected. In the case where there are regulations prescribed by the laws or standards, a channel having a level equal to or higher than the prescribed level is selected.

In an example case, only two carriers, i.e., a carrier 1 and a carrier 2 are available, the carrier 1 is used by the base station c, and the base station a communicates with a mobile terminal in each area by using the carrier 2. In this case, when the base station a performs the carrier sensing operation, the interference level is increased because the carrier 1 is used by the base station c. The base station a selects the carrier 2 and assigns it to the mobile terminal a, so as to establish the link channel.

In the above-described example case, even when the carrier 1 has the available level for the base station a, the carrier 2 is assigned to the mobile terminal a in the service area a. Since the carrier 1 and the carrier 2 are used in the service areas adjacent to the base station b, therefore, the base station b has no available carriers. In such a case, there arises a problem in that it is necessary to provide another carrier (channel) and frequencies cannot be effectively used.

SUMMARY OF THE INVENTION

The invention has been conducted in view of the above-discussed problem. It is an object of the invention to provide a method of assigning an idle channel in which a base station can effectively assign a frequency to a mobile terminal in its service area.

In order to solve the above-discussed problem, the invention is characterized in that, in a method of assigning an idle channel in which a base station assigns one idle channel selected from plural idle channels in response to a link channel establishment request from a mobile terminal, a criterion level for judging whether an idle channel is to be used or not is set to an appropriate value which is higher than a limit level of a ratio of an interference level to a detectable signal receiving level (a DU ratio), and in response to a link channel establishment request from a mobile terminal, the base station performs a carrier sensing operation to obtain all idle channels and signal receiving levels of the idle channels, selects an idle channel having a level which exceeds the set criterion level and is closest to the criterion level, and assigns the selected idle channel as a link channel.

DETAILED DESCRIPTION OF THE PREFERRED EMBODIMENTS

Figure 1:
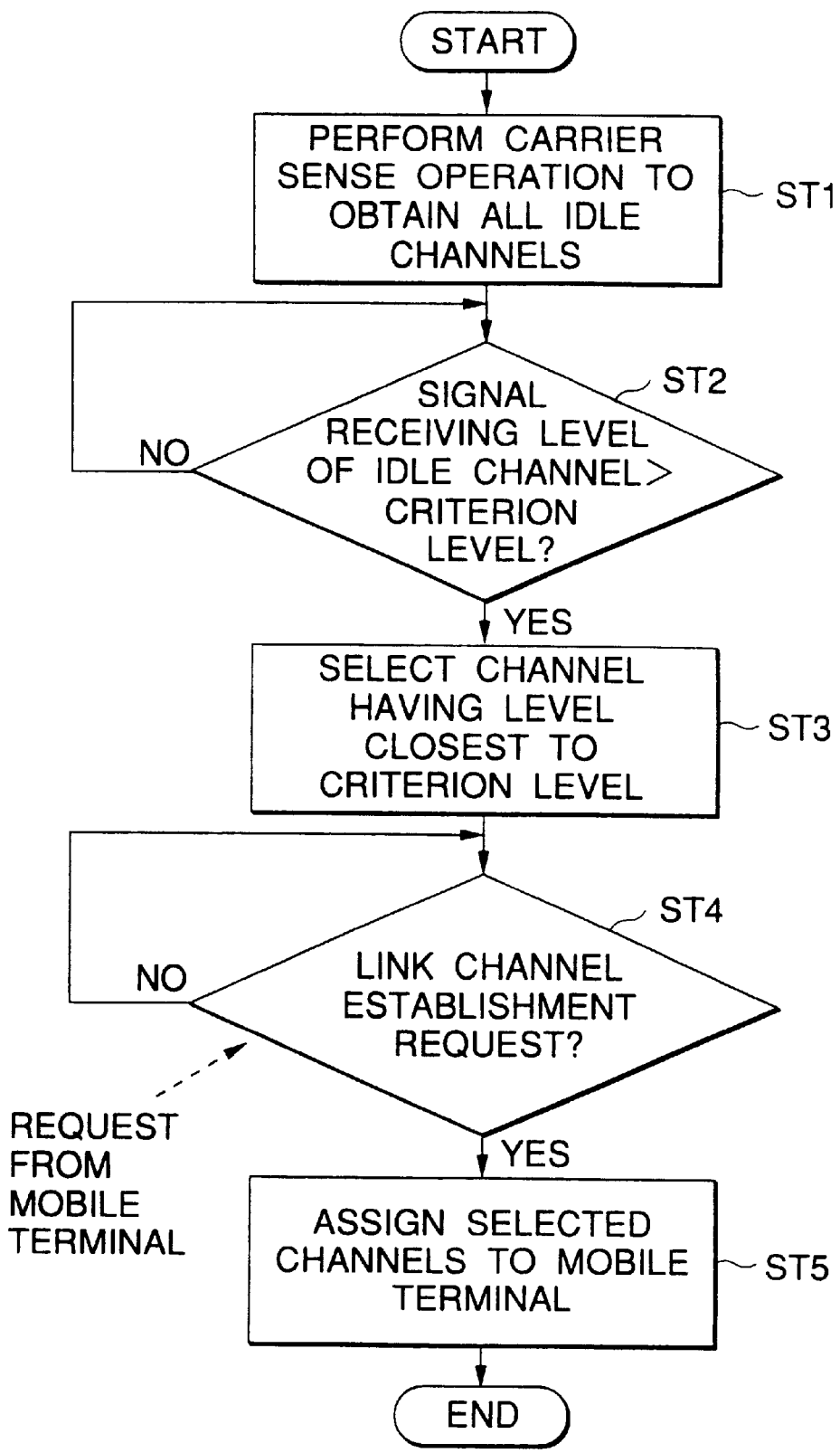
FIG. 1 is a diagram showing a processing flow of the method of assigning an idle channel of the invention.
Figure 3:
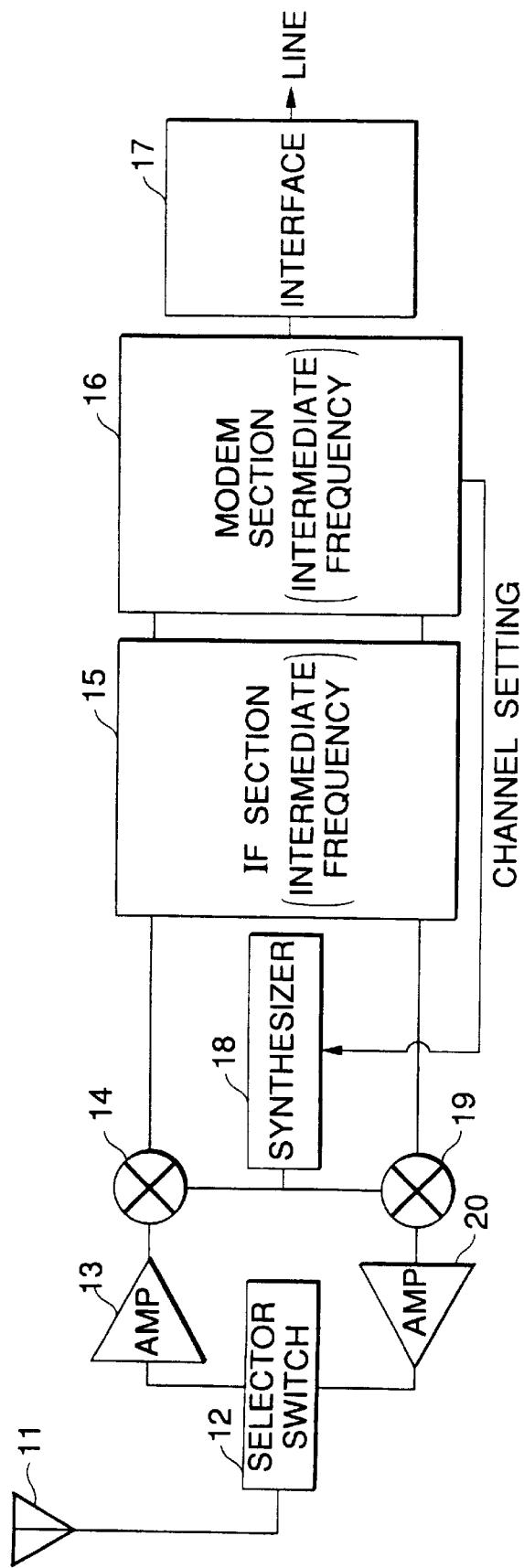
FIG. 3 is a diagram showing an example of the configuration of a base station.
Figure 4:
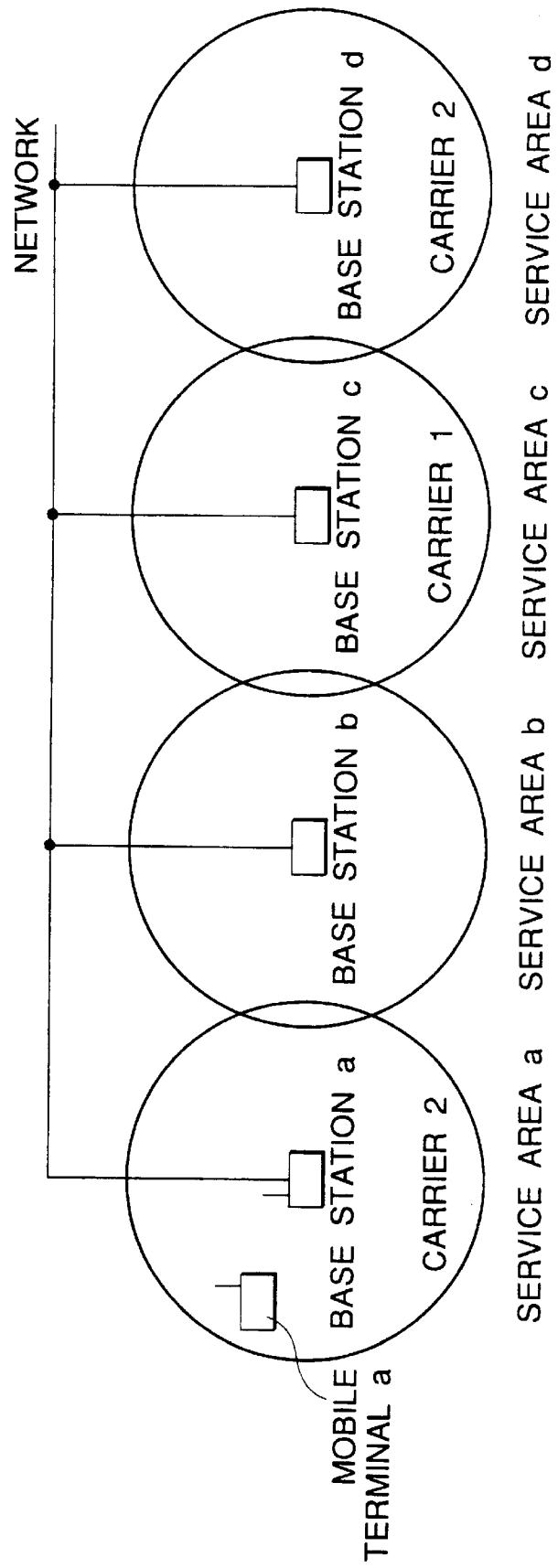
FIG. 4 is a diagram showing an example of service areas of base stations and channel assignment.

Hereinafter embodiments of the invention will be described in detail with reference to the drawings. FIG. 1 is a diagram showing a processing flow of the method of assigning an idle channel of the invention. A program which executes the processing flow of the figure is stored in the modem section 16 (see FIG. 3), and implemented by a CPU (not shown in the figure). The hardware configuration of a base station has been described with reference to FIG. 3 and hence the description thereof is omitted.

As described later in detail, a criterion level for judging whether an idle channel is to be used or not is preset to an appropriate level which is higher than the detectable level in the modem section 16. First, the carrier sensing operation (carrier search) is performed to obtain all idle channels and their receiving levels (step ST1). Next, it is judged whether the signal receiving levels of the idle channels are higher than the criterion level or not (step ST2). If the signal receiving levels of the idle channels are higher than the criterion level, an idle channel having a level which is closest to the criterion level is selected (step ST3).

The base station judges whether there is a link channel establishment request from a mobile terminal in the service area of the station or not (step ST4). If there is a link channel establishment request, the base station assigns the selected channel to the mobile terminal, so as to exchange information (step ST5).

Figure 2:
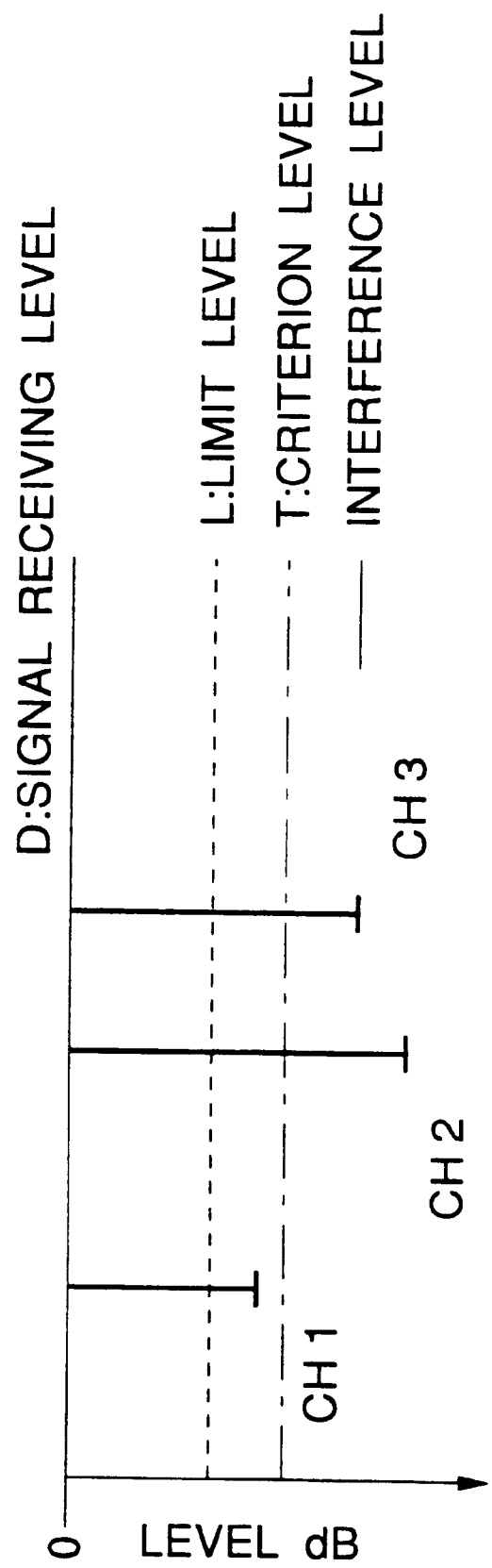
FIG. 2 is a diagram showing an exemplary relationship among a signal receiving level, an interference level, and a criterion level.

FIG. 2 is a diagram showing an exemplary relationship among a signal receiving level, an interference level, and a criterion level. As shown in the figure, it is assumed that a link channel establishment request received from a mobile terminal has a signal receiving level D and three idle channels are obtained as a result of the carrier sensing operation. These three channels are designated as a channel 1, a channel 2, and a channel 3, respectively. A limit receiving level having a receivable and detectable DU ratio (signal receiving level/interference level) is designated as a limit level L. A criterion level T for judging whether an idle channel is to be used or not is set to a level having a predetermined margin with respect to the limit level L.

In the embodiment, the channels 2 and 3 remain in step ST2 of FIG. 1, and the channel 3 is selected in step ST3. If the criterion level T is set so as to be extremely close to the limit level L, the channel 1 is selected. In such a case, the condition is unstable because of fading or fluctuation of radio wave conditions caused by movement of the mobile terminal during the communication, and the channel switching is frequently performed, with the result that good communication cannot be realized. In addition, adjacent base stations and mobile terminals which use the same channel are disturbed.

If the criterion level is set so as to have an excessive margin with respect to the limit level L, the channel 2 is selected and the frequencies cannot be effectively used. Accordingly, each base station is configured so that the criterion level T can be appropriately set in accordance with the installation position of the base station, the environment of the installation position, and the condition of the traffic.

As described above, according to the embodiment, the criterion level T is set to an appropriate level higher than the limit level L which is a limit receiving level of the detectable DU ratio (signal receiving level/interference level). When a link channel establishment request is transmitted from a mobile terminal, an idle channel having a level which exceeds the preset criterion level T and is closest to the criterion level T is selected. Thus, idle channels having available levels are selected in the ascending order of the DU ratio. Accordingly, as compared with a conventional method in which a channel having the highest DU ratio is selected, frequencies are effectively used, and a stable service can be offered.

As described above, according to the invention, a criterion level for judging whether an idle channel is to be used or not is set to an appropriate value which is higher than a limit level of a ratio of an interference level to a detectable signal receiving level (a DU ratio). In response to a link channel establishment request from a mobile terminal, an idle channel having a signal receiving level which exceeds the set criterion level and is closest to the criterion level is selected, and the selected idle channel is assigned as a link channel. Thus, idle channels having available levels are selected in the ascending order of the DU ratio. Accordingly, it is possible to attain an excellent effect that, as compared with a conventional method in which a channel having the highest DU ratio is selected, frequencies are effectively used, and a stable service can be offered.

What is claimed is:

1. A method of assigning an idle channel in which a base station assigns one idle channel selected from plural idle channels in response to a link channel establishment request from a mobile terminal, said method comprising the steps of:

setting a criterion level for judging whether an idle channel is to be used or not to an appropriate value which is higher than a limit level of a ratio of an interference level to a detectable signal receiving level (a DU ratio);

in response to a link channel establishment request from a mobile terminal, performing a carrier sensing operation to obtain all idle channels and signal receiving levels of the idle channels;

selecting an idle channel having a level which exceeds the set criterion level and is closest to the criterion level; and assigning the selected idle channel as a link channel.

2. The method of assigning an idle channel of claim 1, wherein the difference in the criterion level and the limit level is a predetermined margin with respect to the limit level.

3. The method of assigning an idle channel of claim 1, wherein an antenna transmits signals from the base station and receives signals from a mobile terminal.

4. The method of assigning an idle channel of claim 3, wherein the antenna sends signals to and receives signals from a base station service area.

5. The method of assigning an idle channel of claim 4, wherein the base station service area on cross-section is a substantially circular area with the antenna at the center of the area.

6. The method of assigning an idle channel of claim 1, wherein two idle channels are available, a first idle channel and a second idle channel, the first idle channel having a first D/U level and the second idle channel having a second D/U level, the second D/U level higher than the first, wherein a first mobile terminal requests a link channel establishment and thereafter a second mobile terminal requests a link channel establishment, wherein the step of setting a criterion level sets a first criterion level for the first mobile terminal, wherein both the first idle channel and the second idle channel are of sufficient D/U level to exceed the first criterion level for the first mobile unit, and only the second idle channel is of sufficient D/U level to exceed a second criterion level for the second mobile unit, and wherein the step of assigning assigns the first idle channel to the first mobile unit, and following the assigning step, the method further comprises the steps of:

setting a second criterion level for judging whether an idle channel is to be used or not to an appropriate value which is higher that a limit of a ration of an interference level to a detectable signal receiving level (a D/U ratio);

selecting the second idle channel for the second mobile unit; and assigning the second idle channel to the second mobile unit as a link channel.

* * * * *